(12) United States Patent
Sato

(10) Patent No.: US 11,050,325 B2
(45) Date of Patent: Jun. 29, 2021

(54) MOTOR APPARATUS

(71) Applicant: JTEKT CORPORATION, Osaka (JP)

(72) Inventor: Yuto Sato, Nagoya (JP)

(73) Assignee: JTEKT CORPORATION, Osaka (JP)

( * ) Notice: Subject to any disclaimer, the term of this patent is extended or adjusted under 35 U.S.C. 154(b) by 377 days.

(21) Appl. No.: 16/179,337

(22) Filed: Nov. 2, 2018

(65) Prior Publication Data

US 2019/0140520 A1 May 9, 2019

(30) Foreign Application Priority Data

Nov. 9, 2017 (JP) .............................. JP2017-216723

(51) Int. Cl.
*H02K 9/22* (2006.01)
*H02K 11/33* (2016.01)
*H02K 11/30* (2016.01)

(52) U.S. Cl.
CPC ............... *H02K 9/22* (2013.01); *H02K 11/33* (2016.01); *H02K 11/30* (2016.01)

(58) Field of Classification Search
CPC ........... H02K 9/22; H02K 11/33; H02K 11/30
See application file for complete search history.

(56) References Cited

U.S. PATENT DOCUMENTS

| 2006/0158049 A1* | 7/2006 | Suzuki ................. H02K 11/33 310/52 |
| 2012/0104886 A1 | 5/2012 | Yamasaki et al. |
| 2012/0307476 A1 | 12/2012 | Masuzawa et al. |
| 2016/0094175 A1 | 3/2016 | Yamasaki |

FOREIGN PATENT DOCUMENTS

| DE | 102012104426 A1 | 12/2012 |
| DE | 102015218663 A1 | 3/2016 |
| JP | 2017-018055 A | 1/2017 |

OTHER PUBLICATIONS

Mar. 26, 2019 Extended European Search Report issued in European Patent Application No. 18204994.0.

\* cited by examiner

*Primary Examiner* — Jianchun Qin
(74) *Attorney, Agent, or Firm* — Oliff PLC

(57) ABSTRACT

Provided is a motor apparatus in which an increase in its size in a radial direction of a rotation shaft of a motor can be suppressed while securing redundancy of control of driving of the motor. A motor apparatus includes a motor having a rotation shaft, a first control circuit board where a first power circuit and a first control circuit are mounted, and a second control circuit board where a second power circuit and a second control circuit are mounted. The control circuit boards are arranged with an overlapping portion when viewed along an axial direction on an extension line of an axis of the rotation shaft. The overlapping portion intersects the extension line of the rotation shaft of the motor.

10 Claims, 3 Drawing Sheets

MOTOR APPARATUS

INCORPORATION BY REFERENCE

The disclosure of Japanese Patent Application No. 2017-216723 filed on Nov. 9, 2017 including the specification, drawings and abstract, is incorporated herein by reference in its entirety.

BACKGROUND OF THE INVENTION

1. Field of the Invention

The present invention relates to a motor apparatus.

2. Description of the Related Art

Hitherto, there is known a motor apparatus integrally provided with a motor and a control circuit board configured to control the motor. For example, Japanese Patent Application Publication No. 2017-18055 (JP 2017-18055 A) discloses a motor apparatus integrally provided with a motor having a rotation shaft, and a control circuit board configured to control driving of the motor. In this motor apparatus, both the motor and the control circuit board are housed in a housing. A part of the control circuit board protrudes outward in a radial direction of the rotation shaft of the motor with respect to the outer peripheral surface of the motor.

Various circuits such as a power circuit and a control circuit need to be mounted on the control circuit board. The power circuit operates so as to supply electric power necessary to drive the motor. The control circuit controls the operation of the power circuit. When the number of those circuits increases for the purpose of securing redundancy of control of the driving of the motor, the portion of the control circuit board that protrudes outward in the radial direction of the rotation shaft from the outer peripheral surface of the motor increases in size. In this case, the size of the motor apparatus increases in the radial direction of the rotation shaft.

SUMMARY OF THE INVENTION

It is one object of the present invention to provide a motor apparatus in which an increase in its size in a radial direction of a rotation shaft of a motor can be suppressed while securing redundancy of control of driving of the motor.

A motor apparatus according to one aspect of the present invention includes a motor and a plurality of control circuit boards on each of which a power circuit and a control circuit are mounted. The power circuit is configured to operate so as to supply electric power necessary to drive the motor. The control circuit is configured to control an operation of the power circuit. The plurality of control circuit boards are arranged with an overlapping portion when viewed along an axial direction of a rotation shaft of the motor on an extension line of an axis of the rotation shaft. The overlapping portion of the plurality of control circuit boards intersects the extension line of the axis of the rotation shaft.

According to this structure, the plurality of control circuit boards overlap each other, and the overlapping portion intersects the extension line of the axis of the rotation shaft. Therefore, it is possible to suppress the increase in the size of the motor apparatus in the radial direction of the rotation shaft. Thus, the increase in the size of the motor apparatus in the radial direction of the rotation shaft of the motor can be suppressed while securing the redundancy of control of the driving of the motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A motor apparatus of one embodiment of the present invention is described below. The motor apparatus is mounted on an electric power steering system of a vehicle, and generates a torque for assisting a driver's steering operation.

Figure 1:
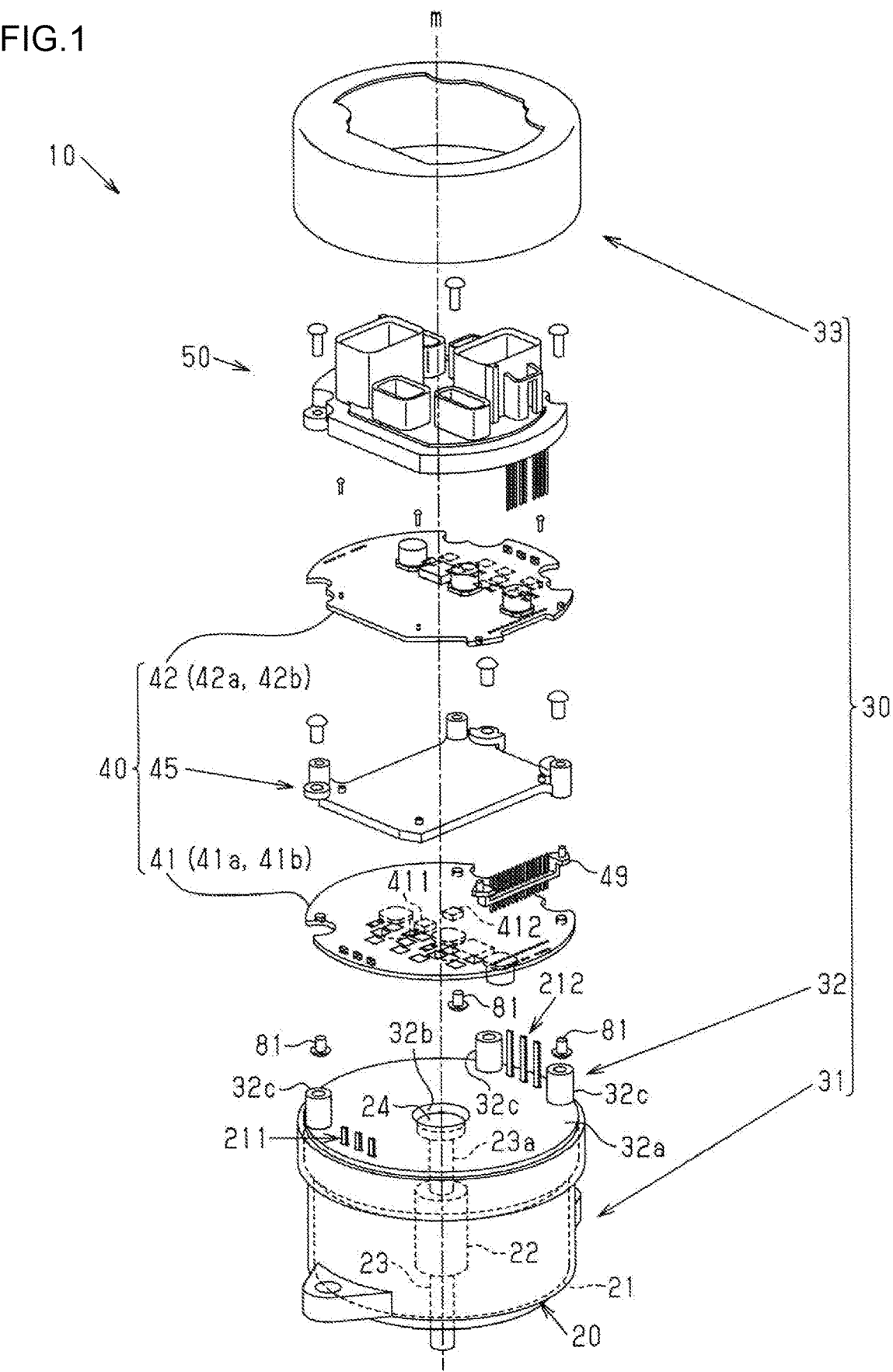
FIG. 1 is an exploded perspective view of a motor apparatus of one embodiment.

As illustrated in FIG. 1, a motor apparatus 10 includes a motor 20, a housing 30, a controller 40, and a connector 50. The motor 20 has a rotation shaft 23. The motor apparatus 10 is constructed by assembling the respective components in an axial direction of the rotation shaft 23.

In the following description, an "axial direction" means the axial direction of the rotation shaft 23. A "radial direction" means a direction orthogonal to the "axial direction". A "circumferential direction" means a direction in which the rotation shaft 23 rotates about an axis of the rotation shaft 23.

The housing 30 includes a bottomed tubular motor housing 31, a disc-shaped rotor housing 32, and a cylindrical cover 33. The motor housing 31 houses the motor 20. The rotor housing 32 covers an opening of the motor housing 31. The cover 33 houses the controller 40 and the connector 50 between the cover 33 and the rotor housing 32.

A three-phase brushless motor is employed as the motor 20. The motor 20 includes a cylindrical stator 21, a cylindrical rotor 22, the rotation shaft 23, and a disc-shaped magnet 24. The rotor 22 is provided on an inner peripheral side of the stator 21. The rotation shaft 23 is provided on an inner peripheral side of the rotor 22 so as to be rotatable together with the rotor 22. The magnet 24 is provided at a first end 23*a* of the rotation shaft 23 on the rotor housing 32 side so as to be rotatable together with the rotation shaft 23. The rotor 22 has a multipole structure with magnetic poles that are N poles and S poles alternately arranged along the outer peripheral surface of the rotor 22.

The stator 21 is fixed to the inner peripheral surface of the motor housing 31. Motor coils are wound around the stator 21. The motor coil is connected to a first bus bar 211 or a second bus bar 212 having three lines corresponding to three phases as one set. The first bus bar 211 and the second bus bar 212 are provided opposite to each other across an extension line m of the axis of the rotation shaft 23. The first bus bar 211 and the second bus bar 212 pass through the rotor housing 32 from the inside of the motor housing 31, and extend toward the cover 33 along the extension line m of the axis of the rotation shaft 23. Three first cylindrical support portions 32*c* are provided on one end face 32*a* of the rotor housing 32 on the cover 33 side. The first cylindrical support portions 32c are provided at irregular intervals on the outer peripheral edge of the one end face 32a. Specifically, two out of the three first cylindrical support portions 32c are provided across the second bus bar 212 in the circumferential direction. The remaining one out of the three first cylindrical support portions 32c is provided so as to be adjacent to the first bus bar 211. Motor coils of two systems are employed as the motor coils. The motor coils of two systems each have three phases that are a U phase, a V phase, and a W phase as one set. The first bus bar 211 is connected to one of the motor coils of two systems, and the second bus bar 212 is connected to the other one of the motor coils of two systems.

The magnet 24 is located inside a through hole 32b provided at the center of the rotor housing 32. The outside diameter of the magnet 24 is set smaller than the bore diameter of the through hole 32b. Therefore, the magnet 24 is rotatable inside the through hole 32b in response to the rotation of the rotation shaft 23. The magnet 24 is a source of a magnetic force necessary to detect a rotation angle of the motor 20. A pair of magnetic sensors 411 and 412 are provided on a first control circuit board 41 described later so as to face the magnet 24 in the axial direction of the rotation shaft 23. The magnetic sensors 411 and 412 detect a change in the magnetic force of the magnet 24 along with the rotation of the rotation shaft 23 of the motor 20.

In the motor 20, a rotating magnetic field is generated by supplying the motor coil with three-phase driving electric power generated based on a rotation angle calculated by using detection results from the magnetic sensors 411 and 412. Along with this, the rotor 22 rotates based on a relationship between the rotating magnetic field generated in the motor coil of the motor 20 and the magnetic poles of the rotor 22.

Figure 2:
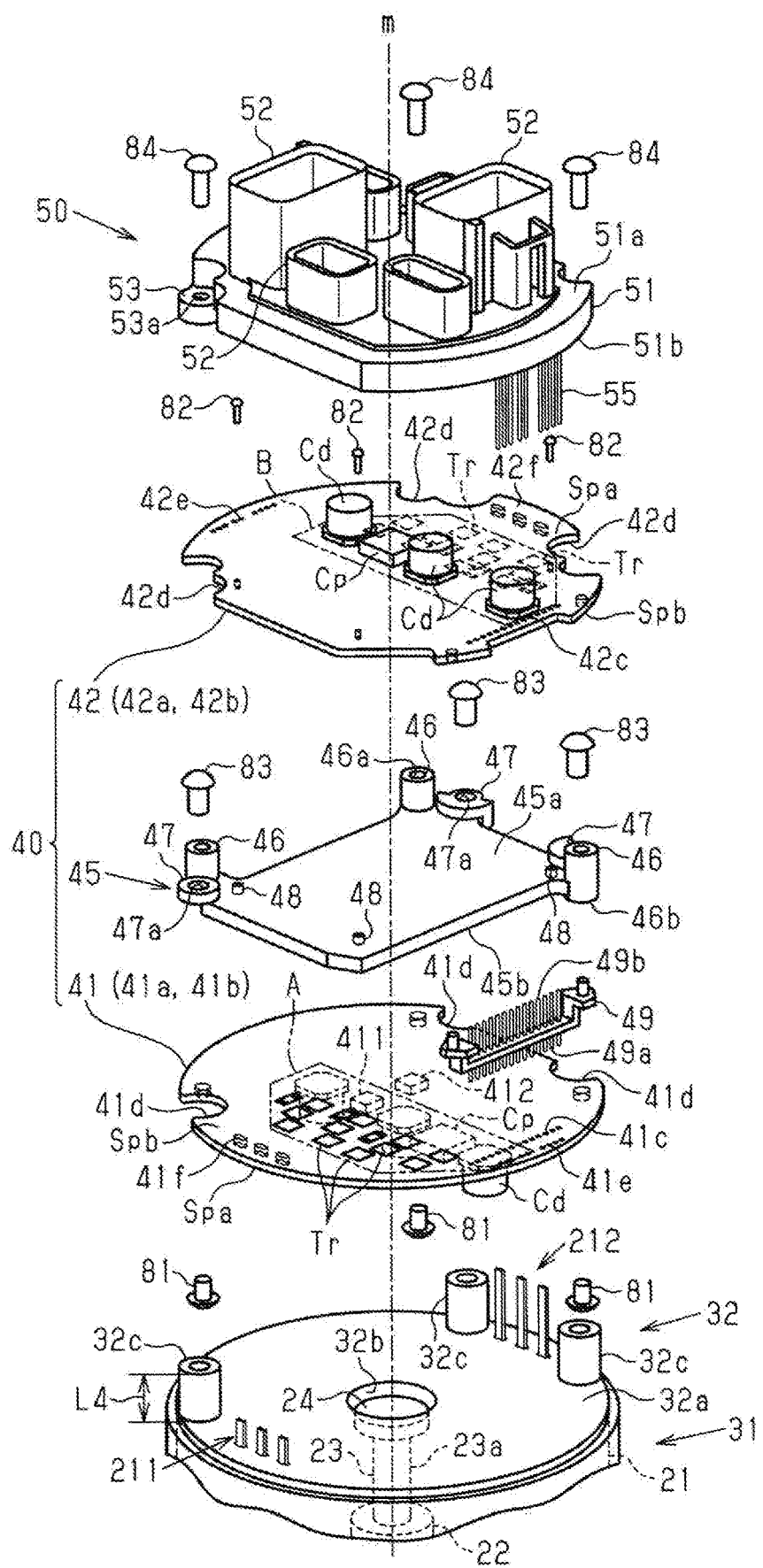
FIG. 2 is an enlarged perspective view of the motor apparatus in the vicinity of a controller.

Next, the structure of the controller 40 is described. As illustrated in FIG. 2, the controller 40 includes a heat sink 45, the first control circuit board 41, a second control circuit board 42, and a relay terminal member 49. The heat sink 45 has a function of promoting heat dissipation of the components of the motor apparatus 10. The first control circuit board 41 and the second control circuit board 42 are provided across the heat sink 45 in the axial direction. The relay terminal member 49 electrically connects the control circuit boards 41 and 42 together.

The heat sink 45 has a rectangular plate shape. Second cylindrical support portions 46 are provided at three corners out of four corners of the heat sink 45. The second cylindrical support portions 46 extend along a thickness direction of the heat sink 45. The second cylindrical support portion 46 has an extending portion 46a and an extending portion 46b. The extending portion 46a extends toward the connector 50. The extending portion 46b extends toward the motor housing 31. A length L1 (see FIG. 3) of the extending portion 46a of the second cylindrical support portion 46 with respect to one end face 45a of the heat sink 45 is set larger than a length L2 (see FIG. 3) of the extending portion 46b of the second cylindrical support portion 46 with respect to the other end face 45b of the heat sink 45.

The heat sink 45 is provided with fixing protrusions 47 that adjoin the respective second cylindrical support portions 46. The fixing protrusions 47 are provided at positions corresponding to the first cylindrical support portions 32c of the rotor housing 32 in the axial direction. The fixing protrusion 47 protrudes from the one end face 45a of the heat sink 45 toward the second control circuit board 42, and also protrudes in the radial direction. A length T of the fixing protrusion 47 in the axial direction is set smaller than the length L1 of the extending portion 46a of the second cylindrical support portion 46 (see FIG. 3). The fixing protrusion 47 is provided with a through hole 47a extending in the axial direction. Fixing portions 48 such as bosses are provided at three corners out of the four corners of the one end face 45a of the heat sink 45.

Figure 3:
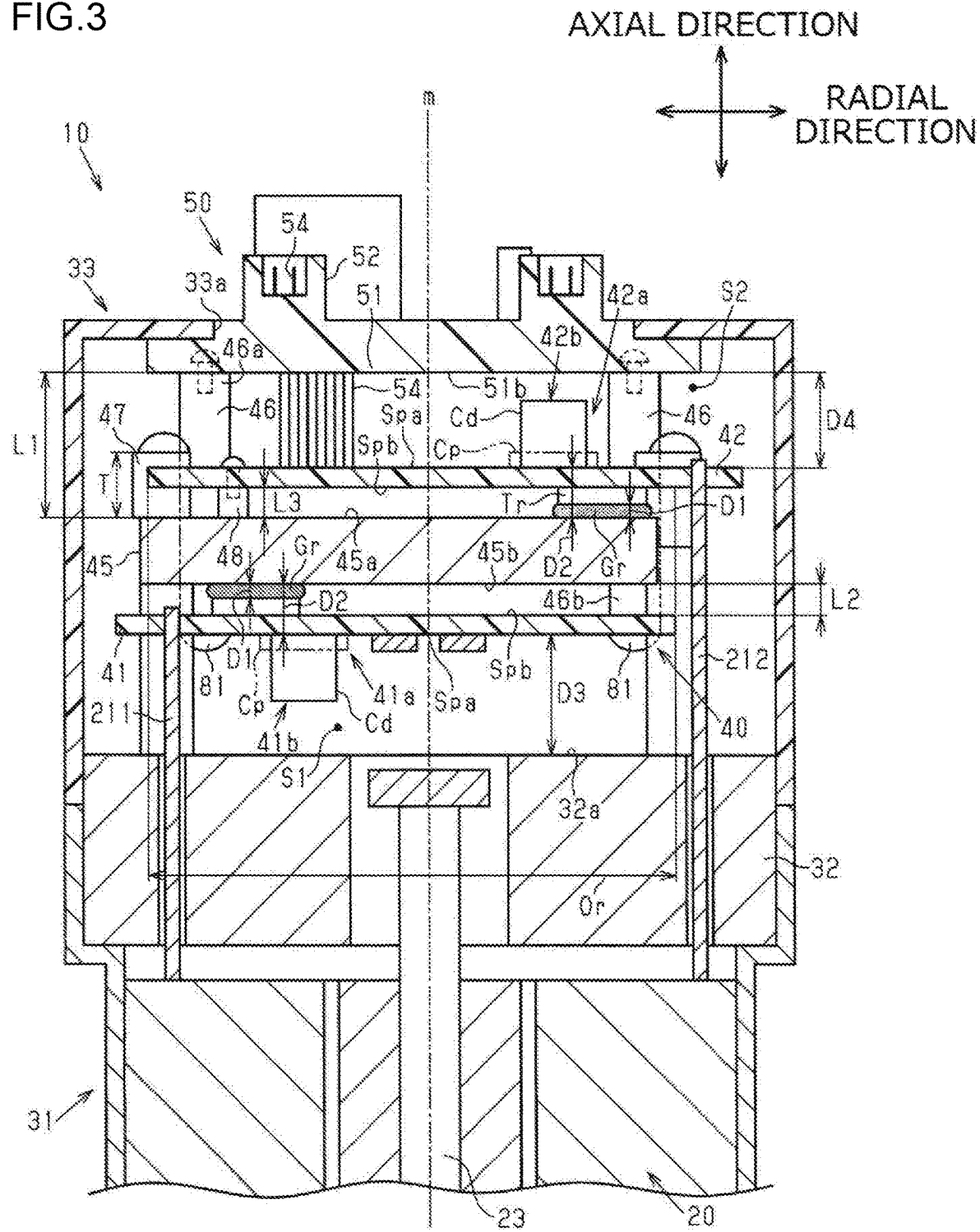
FIG. 3 is a sectional view of the motor apparatus of the embodiment that is cut along an axis of a rotation shaft.

As illustrated in FIG. 3, a length L3 of the fixing portion 48 with respect to the one end face 45a of the heat sink 45 is equal to the length L2 of the extending portion 46b of the second cylindrical support portion 46, and is set smaller than the length T of the fixing protrusion 47. The thickness direction of the heat sink 45 coincides with the axial direction.

As illustrated in FIG. 2, the first control circuit board 41 has a disc shape. The first control circuit board 41 is provided between the rotor housing 32 and the heat sink 45 in the axial direction. Circuits configured to control driving of the motor 20 through the motor coil connected to the first bus bar 211 are mounted on the first control circuit board 41. Specifically, a first power circuit 41a and a first control circuit 41b are mounted on the first control circuit board 41. The first power circuit 41a operates so as to supply electric power necessary to drive the motor 20. The first control circuit 41b controls the operation of the first power circuit 41a.

The second control circuit board 42 has a disc shape. The second control circuit board 42 is provided between the heat sink 45 and the connector 50 in the axial direction. Circuits configured to control the driving of the motor 20 through the motor coil connected to the second bus bar 212 are mounted on the second control circuit board 42. Specifically, a second power circuit 42a and a second control circuit 42b are mounted on the second control circuit board 42. The second power circuit 42a operates so as to supply electric power necessary to drive the motor 20. The second control circuit 42b controls the operation of the second power circuit 42a.

Each of the power circuits 41a and 42a is constituted by a plurality of electronic components including a plurality of transistors Tr as heating elements, and capacitors Cd for stabilizing supply of electric power to the transistors Tr. Each of the control circuits 41b and 42b is constituted by a plurality of electronic components including a plurality of integrated circuits Cp. The transistors Tr are mounted on mounting faces Spb of the control circuit boards 41 and 42, which face the one end face 45a and the other end face 45b of the heat sink 45 in the axial direction. The electronic components such as the capacitors Cd and the integrated circuits Cp other than the transistors Tr are mounted on mounting faces Spa of the control circuit boards 41 and 42, which are opposite to the respective mounting faces Spb. The magnetic sensors 411 and 412 are provided at a central part of the mounting face Spa of the first control circuit board 41.

The two control circuit boards 41 and 42 basically have the same structure. Therefore, even if an abnormality occurs in one of the control circuit boards or in the motor coil in one system, the motor 20 can be driven continuously through the motor coil to be controlled by the remaining control circuit board that operates properly. That is, redundancy of control of the driving of the motor 20 is secured in the motor apparatus 10.

As illustrated in FIG. 3, the control circuit boards 41 and 42 are arranged with an overlapping portion Or when viewed along the axial direction on the extension line m of the axis of the rotation shaft 23. The overlapping portion Or of the control circuit boards 41 and 42 intersects the extension line m.

In a state in which the control circuit boards 41 and 42 are arranged across the heat sink 45 in the axial direction, thickness directions of the control circuit boards 41 and 42 coincide with the axial direction. That is, the control circuit boards 41 and 42 are provided so that the respective mounting faces Spa and Spb are parallel to each other in a state in which the respective mounting faces Spb face the heat sink 45.

As illustrated in FIG. 2, the power circuits 41a and 42a are provided in areas A and B on the control circuit boards 41 and 42, respectively. The areas A and B are located away from the extension line m and closer to the outer peripheral edges. The control circuits 41b and 42b are provided at the same positions as those of the areas A and B on the control circuit boards 41 and 42 where the power circuits 41a and 42a are mounted, respectively.

The areas A and B on the control circuit boards 41 and 42 where the power circuits 41a and 42a are mounted are arranged so as not to overlap each other in the axial direction when viewed along the axial direction on the extension line m of the axis of the rotation shaft 23. Specifically, the areas A and B on the control circuit boards 41 and 42 where the power circuits 41a and 42a are provided are arranged so as to have rotational symmetry (two-fold rotational symmetry) about the axis center of the rotation shaft 23. That is, the control circuit boards 41 and 42 have rotational symmetry about the axis center of the rotation shaft 23 in terms of the arrangement of the electronic components such as the transistors Tr, the capacitors Cd, and the integrated circuits Cp that constitute the power circuits 41a and 42a and the control circuits 41b and 42b (see FIG. 2). The magnetic sensors 411 and 412 are arranged at positions that are rotationally symmetrical about the axis center of the rotation shaft 23, and have symmetry in the radial direction.

On the outer peripheral edge of the first control circuit board 41, first cutout portions 41d are provided at positions corresponding to the first cylindrical support portions 32c of the rotor housing 32 in the axial direction. The first cutout portion 41d is formed by cutting out a part of the first control circuit board 41. The first cutout portion 41d has a shape conforming to the outline of the first cylindrical support portion 32c. The first control circuit board 41 is fixed to the extending portions 46b of the three second cylindrical support portions 46 with three fasteners 81 such as screws. At this time, the outer peripheral edge of the mounting face Spb of the first control circuit board 41 abuts against the extending portions 46b of the second cylindrical support portions 46.

On the outer peripheral edge of the second control circuit board 42, second cutout portions 42d are provided at positions corresponding to the second cylindrical support portions 46 and the fixing protrusions 47 of the heat sink 45 in the axial direction. The second cutout portion 42d is formed by cutting out a part of the second control circuit board 42. The second cutout portion 42d has a shape conforming to the outline of the second cylindrical support portion 46 and the fixing protrusion 47 on an inner side in the radial direction of the rotation shaft 23. The second control circuit board 42 is fixed to the three fixing portions 48 of the heat sink 45 with three fasteners 82 such as screws. At this time, the outline portions of the second cylindrical support portions 46 and the fixing protrusions 47 of the heat sink 45 on the inner side in the radial direction of the rotation shaft 23 are fitted to the respective cutout portions 42d of the second control circuit board 42. The second control circuit board 42 abuts against the fixing portions 48.

As illustrated in FIG. 3, the transistors Tr mounted on the mounting faces Spb of the control circuit boards 41 and 42 are provided with clearances from the one end face 45a and the other end face 45b of the heat sink 45. That is, the length L2 of the extending portion 46b of the second cylindrical support portion 46 and the length L3 of the fixing portion 48 in the axial direction are set so that the transistors Tr are kept out of contact with the heat sink 45 when the control circuit boards 41 and 42 are attached to the heat sink 45.

At this time, comparison is made between distances in the axial direction between the heat sink 45 and the electronic components that constitute the power circuits 41a and 42a and the control circuits 41b and 42b mounted on the control circuit boards 41 and 42. Specifically, as the distances in the axial direction between the heat sink 45 and the electronic components that constitute the power circuits 41a and 42a and the control circuits 41b and 42b, comparison is made between a distance D1 between the heat sink 45 and the transistor Tr mounted on the mounting face Spb of each of the control circuit boards 41 and 42 and a distance D2 between the heat sink 45 and the electronic component other than the transistor Tr, which is mounted on the mounting face Spa of each of the control circuit boards 41 and 42. In this case, the distance D1 in the axial direction between the transistor Tr and each of the one end face 45a and the other end face 45b of the heat sink 45 is shortest.

The distance D1 in the axial direction between the heat sink 45 and the transistor Tr on the mounting face Spb of the first control circuit board 41 is equal to the distance D1 in the axial direction between the heat sink 45 and the transistor Tr on the mounting face Spb of the second control circuit board 42. This is because the length L3 of the fixing portion 48 of the heat sink 45 is equal to the length L2 of the extending portion 46b of the second cylindrical support portion 46. The clearance between the transistor Tr and each of the one end face 45a and the other end face 45b of the heat sink 45 is filled with heat dissipation grease Gr. Thus, heat generated from the transistor Tr is transferred to the heat sink 45 through a heat dissipation path via the heat dissipation grease Gr.

As illustrated in FIG. 2, the relay terminal member 49 electrically connects the control circuit boards 41 and 42 together, thereby functioning as a part of a communication circuit configured to share information between the control circuit boards 41 and 42. Examples of the information include a signal for synchronizing operations between the integrated circuits Cp mounted on the control circuit boards 41 and 42, and magnetic signals from the magnetic sensors 411 and 412 provided on the first control circuit board 41. The relay terminal member 49 is interposed between the outer peripheral edges of the mounting faces Spb of the control circuit boards 41 and 42 in the axial direction. The relay terminal member 49 has two connection terminals 49a and 49b between the mounting faces Spb of the control circuit boards 41 and 42. Each of the connection terminals 49a and 49b has a plurality of pins that can establish electrical connection to the control circuit board 41 or 42. The connection terminal 49a is inserted into a plurality of terminal holes 41c provided in the first control circuit board 41, and is joined by soldering. Thus, the relay terminal member 49 is electrically connected to the first control circuit 41b of the first control circuit board 41. The connection terminal 49b is inserted into a plurality of terminal holes 42c provided in the second control circuit board 42, and is joined by soldering. Thus, the relay terminal member 49 is electrically connected to the second control circuit 42b of the second control circuit board 42.

As illustrated in FIG. 3, the controller 40 is completed in a state in which the control circuit boards 41 and 42, the heat sink 45, and the relay terminal member 49 (see FIG. 2) are assembled. In this state, the controller 40 is electrically connected to the first bus bar 211 and the second bus bar 212 of the motor 20. Specifically, the first bus bar 211 is inserted into a plurality of terminal holes 41f (see FIG. 2) provided in the first control circuit board 41, and is joined by soldering. The second bus bar 212 is inserted into a plurality of terminal holes 42f (see FIG. 2) provided in the second control circuit board 42, and is joined by soldering. Thus, the motor 20 and the controller 40 are electrically connected together.

As illustrated in FIG. 2, when the motor 20 and the controller 40 are electrically connected together, the first cylindrical support portions 32c of the rotor housing 32 are inserted through the first cutout portions 41d of the first control circuit board 41, and are brought into abutment against the fixing protrusions 47 of the heat sink 45, respectively. Then, the heat sink 45 is fixed to the rotor housing 32 and furthermore the controller 40 is fixed to the rotor housing 32 by inserting fasteners 83 such as screws into the through holes 47a of the fixing protrusions 47 and cylindrical holes of the first cylindrical support portions 32c, respectively. At this time, the capacitors Cd provided on the mounting face Spa of the first control circuit board 41 do not abut against the one end face 32a of the rotor housing 32 in the axial direction (see FIG. 3).

The connector 50 is provided opposite to the rotor housing 32 in the axial direction. The connector 50 has a function of electrically connecting the control circuit boards 41 and 42 to a battery, an external device, or the like. The connector 50 includes a plate-shaped base portion 51, a plurality of bottomed tubular connection portions 52, three fastening portions 53, a connection terminal 54 (see FIG. 3), and a connection terminal 55. The base portion 51 is provided so as to fix the connector 50 to the first cylindrical support portions 32c of the rotor housing 32. The connection portions 52 extend from one end face 51a of the base portion 51 toward a side opposite to the rotor housing 32 in the axial direction. The fastening portions 53 are provided on the outer periphery of the base portion 51. Each of the two connection terminals 54 and 55 protrudes from the inside of the connection portion 52 and the other end face 51b of the base portion 51, and has a plurality of pins.

The fastening portions 53 are provided at positions corresponding to the extending portions 46a of the second cylindrical support portions 46. The fastening portion 53 is provided with a through hole 53a passing through the fastening portion 53 in its thickness direction. The connector 50 is fixed to the heat sink 45 by inserting three fasteners 84 such as screws through the through holes 53a of the fastening portions 53 and cylindrical holes of the extending portions 46a of the second cylindrical support portions 46, respectively.

As illustrated in FIG. 3, in a state in which the connector 50 is fixed to the extending portions 46a of the second cylindrical support portions 46, the other end face 51b of the base portion 51 of the connector 50 does not abut against the capacitors Cd provided on the mounting face Spa of the second control circuit board 42.

As illustrated in FIG. 2, the connection terminal 55 extends from the other end face 51b of the base portion 51 toward the motor housing 31 along the axial direction. The connection terminal 55 is inserted into a plurality of terminal holes 41e provided in the first control circuit board 41, and is joined by soldering. That is, the connector 50 is electrically connected to the first power circuit 41a and the first control circuit 41b of the first control circuit board 41.

As illustrated in FIG. 3, the connection terminal 54 of the connector 50 extends from the other end face 51b of the base portion 51 toward the motor housing 31 along the axial direction. The connection terminal 54 is inserted into a plurality of terminal holes 42e (see FIG. 2) provided in the second control circuit board 42, and is joined by soldering. That is, the connector 50 is electrically connected to the second power circuit 42a and the second control circuit 42b of the second control circuit board 42. The connection portions 52 of the connector 50 are exposed to the outside opposite to the motor housing 31 from an insertion hole 33a provided at the top of the cover 33 in the axial direction.

In a state in which the motor apparatus 10 is assembled, a distance D3 in the axial direction from the mounting face Spa of the first control circuit board 41 to the one end face 32a of the rotor housing 32 is set equal to a distance D4 from the mounting face Spa of the second control circuit board 42 to the other end face 51b of the connector 50. That is, an air space S1 serving as a first thermal insulation layer and an air space S2 serving as a second thermal insulation layer are formed between the first control circuit board 41 and the rotor housing 32 and between the second control circuit board 42 and the connector 50. The air spaces S1 and S2 have equal thicknesses in the axial direction. In other words, the first control circuit board 41 and the second control circuit board 42 are interposed between the heat sink 45 and the air space S1 and between the heat sink 45 and the air space S2 in the axial direction.

In order to provide the air spaces S1 and S2, a length L4 (see FIG. 2) of the first cylindrical support portion 32c of the rotor housing 32 from the one end face 32a and the length L1 of the extending portion 46a of the second cylindrical support portion 46 are set as follows. That is, the length L4 is set so that the capacitors Cd mounted on the mounting face Spa of the first control circuit board 41 are kept out of contact with the one end face 32a of the rotor housing 32. The length L1 is set so that the capacitors Cd mounted on the mounting face Spa of the second control circuit board 42 are kept out of contact with the other end face 51b of the connector 50.

By providing the air spaces S1 and S2, heat generated from the power circuits 41a and 42a of the control circuit boards 41 and 42 is not easily transferred to the rotor housing 32 and the connector 50, and most of the heat is transferred to the heat sink 45. The reason why the distances D3 and D4 corresponding to the thicknesses of the air spaces S1 and S2 are set equal to each other is to reduce a temperature difference between the temperature of the transistor Tr of the first control circuit board 41 and the temperature of the transistor Tr of the second control circuit board 42.

Actions and effects of the motor apparatus 10 of this embodiment are described below.

(1) The control circuit boards 41 and 42 overlap each other, and the overlapping portion Or intersects the extension line m of the axis of the rotation shaft 23. Therefore, it is possible to suppress an increase in the size of the motor apparatus 10 in the radial direction of the rotation shaft 23. Thus, the increase in the size of the motor apparatus 10 in the radial direction of the rotation shaft 23 of the motor 20 can be suppressed while securing the redundancy of control of the driving of the motor 20.

(2) The mounting faces Spb of the control circuit boards 41 and 42 where the transistors Tr of the power circuits 41a and 42a are mounted face the one end face 45a and the other end face 45b of the heat sink 45.

Therefore, it is likely that the amounts of heat to be transferred from the transistors Tr of the control circuit boards 41 and 42 to the heat sink 45 are increased as compared to a structure in which the mounting face Spb of the first control circuit board 41 where the transistors Tr of the power circuit 41a of the first control circuit board 41 are mounted and the mounting face Spb of the second control circuit board 42 where the transistors Tr of the power circuit 42a of the second control circuit board 42 are mounted do not face the heat sink 45.

Further, it is likely that a difference between the amount of heat to be transferred from the transistor Tr of the first control circuit board 41 to the heat sink 45 and the amount of heat to be transferred from the transistor Tr of the second control circuit board 42 to the heat sink 45 is reduced as compared to a structure in which the mounting face Spb of one control circuit board out of the first control circuit board 41 and the second control circuit board 42 where the transistors Tr of the power circuit are mounted faces the heat sink 45 and the mounting face Spb of the other control circuit board where the transistors Tr of the power circuit are mounted does not face the heat sink 45.

Therefore, the temperature difference between the transistors Tr of both the control circuit boards 41 and 42 can be reduced while reducing the temperatures of the transistors Tr. Thus, it is possible to reduce the occurrence of a case where the power supply to the motor 20 from the first control circuit board 41 deviates from the power supply to the motor 20 from the second control circuit board 42 due to the occurrence of a difference between thermal resistances of the power circuits 41a and 42a, in particular, the transistors Tr of both the control circuit boards 41 and 42. That is, it is possible to reduce the occurrence of a case where the torque of the motor 20 fluctuates.

(3) The distance D1 between each of the one end face 45a and the other end face 45b of the heat sink 45 and the transistor Tr mounted on the mounting face Spb of each of the control circuit boards 41 and 42 among the electronic components that constitute the power circuits 41a and 42a and the control circuits 41b and 42b mounted on the control circuit boards 41 and 42 is shortest.

Therefore, it is likely that the amount of heat to be dissipated from the transistor Tr to the heat sink 45 is larger than the amount of heat to be dissipated from the electronic component other than the transistor Tr to the heat sink 45. Thus, it is possible to dissipate heat from the transistor Tr to the heat sink 45 more efficiently.

(4) The distance D1 between the heat sink 45 and the transistor Tr provided on the mounting face Spb of the first control circuit board 41 is equal to the distance D1 between the heat sink 45 and the transistor Tr provided on the mounting face Spb of the second control circuit board 42.

Therefore, it is unlikely that a difference occurs between the amount of heat to be dissipated from the transistor Tr of the first control circuit board 41 to the heat sink 45 and the amount of heat to be dissipated from the transistor Tr of the second control circuit board 42 to the heat sink 45. Thus, it is possible to further reduce the temperature difference between the temperature of the transistor Tr of the first control circuit board 41 and the temperature of the transistor Tr of the second control circuit board 42.

(5) The areas A and B on the control circuit boards 41 and 42 where the power circuits 41a and 42a are mounted are arranged so as not to overlap each other in the axial direction when viewed along the axial direction on the extension line m of the axis of the rotation shaft 23. Specifically, the areas A and B on the control circuit boards 41 and 42 where the power circuits 41a and 42a are provided are arranged so as to have rotational symmetry about the extension line m of the rotation shaft 23.

Therefore, the portion of the heat sink 45 to which heat is transferred from the power circuit 41a of the first control circuit board 41 and the portion of the heat sink 45 to which heat is transferred from the power circuit 42a of the second control circuit board 42 are different from each other in the radial direction of the rotation shaft 23. Thus, the heat dissipation efficiency of the heat sink 45 can further be improved.

(6) By providing the air spaces S1 and S2, most of the heat generated from the power circuits 41a and 42a of the control circuit boards 41 and 42 is transferred to the heat sink 45. Therefore, the direction in which the heat generated from each of the control circuit boards 41 and 42 is transferred is the direction to the heat sink 45. Thus, it is possible to simplify the condition to be taken into consideration in order to reduce the temperature difference between the transistors Tr of the control circuit boards 41 and 42.

(7) The first cylindrical support portions 32c of the rotor housing 32 are fitted to the first cutout portions 41d of the first control circuit board 41, and the second cylindrical support portions 46 and the fixing protrusions 47 of the heat sink 45 are fitted to the second cutout portions 42d of the second control circuit board 42, respectively. Thus, it is possible to perform positioning for fixing the control circuit boards 41 and 42 to the extending portions 46b of the second cylindrical support portions 46 and the fixing portions 48 with the fasteners 81 and 82, respectively.

Relative rotation of the first control circuit board 41 in the circumferential direction is suppressed by the first cylindrical support portions 32c, and relative rotation of the second control circuit board 42 in the circumferential direction is suppressed by the second cylindrical support portions 46 and the fixing protrusions 47. Thus, it is possible to secure symmetry of the electronic components including the power circuits 41a and 42a and the control circuits 41b and 42b mounted on the control circuit boards 41 and 42.

(8) For example, it is assumed that the power circuits 41a and 42a are arranged on one of the two control circuit boards and the control circuits 41b and 42b are arranged on the other. In this case, many connection terminals are necessary to connect the first power circuit 41a to the first control circuit 41b and the second power circuit 42a to the second control circuit 42b. Thus, the connection between the control circuit boards may be complicated.

In the motor apparatus 10, the first power circuit 41a and the first control circuit 41b are mounted on the first control circuit board 41, and the second power circuit 42a and the second control circuit 42b are mounted on the second control circuit board 42. That is, the power circuit and the control circuit are mounted on the control circuit board without being separated from each other. With this structure, the structures for connecting the control circuit boards 41 and 42 together can be centralized in the relay terminal member 49 alone. Thus, the connection between the control circuit boards 41 and 42 can be simplified, and the productivity of the motor apparatus 10 can be improved. Further, the number of connection terminals for connecting the control circuit boards 41 and 42 together can be reduced, and therefore the manufacturing cost of the motor apparatus 10 can be reduced as well.

This embodiment may be modified as follows without causing any technical contradiction. The air spaces S1 and S2 have equal thicknesses, but may have, for example, unequal thicknesses. In this case, the thicknesses of the air spaces S1 and S2 may be changed as appropriate under the following conditions. The distances in the axial direction from the control circuit boards 41 and 42 to the rotor housing 32 and the connector 50 are sufficiently long, and the heat generated in the power circuits 41*a* and 42*a* is not transferred from the control circuit boards 41 and 42 to the rotor housing 32 and the connector 50. Even if the heat is transferred, a temperature difference does not occur between the transistors Tr of the control circuit boards 41 and 42.

The air spaces S1 and S2 may be replaced with thermal insulation layers formed by different members. Alternatively, only one of the air spaces S1 and S2 may be replaced with a thermal insulation layer formed by a different member. Any thermal insulation layer may be provided as long as the thermal insulation layer is set so as to minimize the temperature difference between the transistors Tr of the control circuit boards 41 and 42.

The distances D1 between the heat sink 45 and the transistors Tr of the power circuits 41*a* and 42*a* of the control circuit boards 41 and 42 are set equal to each other, but the present invention is not limited to this case as long as the thermal insulation layers are set or any other measures are taken so as to minimize the temperature difference between the transistors Tr of the control circuit boards 41 and 42.

The electronic components that constitute the power circuits 41*a* and 42*a* and the control circuits 41*b* and 42*b* of the control circuit boards 41 and 42 are provided so as to have rotational symmetry about the axis center of the rotation shaft 23, but the present invention is not limited to this case. For example, the electronic components may be provided at any positions as long as the areas A and B of the power circuits 41*a* and 42*a* are provided so as not to overlap each other when viewed along the axial direction on the extension line m of the axis of the rotation shaft 23. The power circuits 41*a* and 42*a* of the control circuit boards 41 and 42 may overlap each other when viewed along the axial direction on the extension line m of the axis of the rotation shaft 23. At this time, it is only necessary that the heat dissipation performance of the heat sink 45 be sufficiently provided by, for example, increasing the thickness of the heat sink 45.

The control circuit boards 41 and 42 need not have the same structure. That is, the control circuit boards 41 and 42 may be set different from each other in terms of the types of the electronic components including the power circuits 41*a* and 42*a* and the control circuits 41*b* and 42*b*, or in terms of the arrangement of the electronic components. Along with this, the electronic components that constitute the power circuits 41*a* and 42*a* and the control circuits 41*b* and 42*b* may be mounted collectively on only one of the mounting faces Spa and Spb of the control circuit boards 41 and 42. In this case, the heat sink 45 and the control circuit boards 41 and 42 are located as close as possible so that the heat generated from the electronic components, in particular, from the heating elements such as the transistors Tr can be dissipated.

The distance D1 between the heat sink 45 and the transistor Tr of each of the power circuits 41*a* and 42*a* among the electronic components mounted on the control circuit boards 41 and 42 is shortest. For example, a shunt resistor that is one of the electronic components that constitute the power circuits 41*a* and 42*a* may be regarded as the heating element, and a distance between the shunt resistor and the heat sink 45 may be set shortest. That is, it is only necessary that the distance between the heat sink 45 and the heating element of each of the power circuits 41*a* and 42*a* be set shortest among the distances in the axial direction between the heat sink 45 and the electronic components that constitute the power circuits 41*a* and 42*a* and the control circuits 41*b* and 42*b* mounted on the control circuit boards 41 and 42.

The distance between the heat sink 45 and the heating element of each of the power circuits 41*a* and 42*a* of the control circuit boards 41 and 42 need not be shortest. The integrated circuit Cp that constitutes each of the control circuits 41*b* and 42*b* may be located closest to the heat sink 45.

The heat dissipation grease Gr is provided between the heat sink 45 and the transistor Tr that constitutes each of the power circuits 41*a* and 42*a*, but may be replaced with, for example, a heat dissipation sheet.

The heat sink 45 has a rectangular plate shape, but the present invention is not limited to this case. The heat sink 45 may have any shape as long as the heat sink 45 can be provided between the control circuit boards 41 and 42 in the axial direction.

A cooling structure using a fan may be employed in place of the heat sink 45. Along with this change, the heat dissipation grease Gr or the heat dissipation sheet is omitted, and the fan is newly provided with a structure for fixing the control circuit boards 41 and 42. Further, the heat sink 45 or the fan may be omitted.

Each of the control circuit boards 41 and 42 has a disc shape, but may have any shape as long as each of the control circuit boards 41 and 42 can be housed in the housing 30, for example. The control circuit boards 41 and 42 are parallel along the radial direction of the rotation shaft 23, but the present invention is not limited to this case. For example, the control circuit boards 41 and 42 may be provided so as to be inclined slightly with respect to the extension line m. Also in this case, the increase in the size of the motor apparatus 10 in the radial direction of the rotation shaft 23 can be suppressed as long as the overlapping portion Or of the control circuit boards 41 and 42 is provided so as to intersect the extension line m of the rotation shaft 23.

When the redundancy of control of the driving of the motor 20 is secured, the control circuit boards 41 and 42 are provided for the motor coils of two systems. Control circuit boards of three or more systems may be provided for motor coils of three or more systems. In this case, areas on the three control circuit boards where power circuits are provided are preferably arranged at positions with three-fold rotational symmetry, and areas on N control circuit boards where power circuits are provided are preferably arranged at positions with N-fold rotational symmetry.

The magnetic sensors 411 and 412 are provided on the mounting face Spa of the first control circuit board 41, but may be provided on the mounting face Spb of the first control circuit board 41. In this case, the magnetic sensors 411 and 412 are prevented from abutting against the other end face 45*b* of the heat sink 45. The magnetic sensors 411 and 412 may be mounted on the second control circuit board 42. Considering the accuracy of detection of the rotation angle of the motor 20, the magnetic sensors 411 and 412 are preferably provided on the mounting face Spa of the first control circuit board 41. Each of the magnetic sensors 411 and 412 may be a sensor using a Hall integrated circuit (IC) or the like.

The rotation angle of the motor 20 may be detected by using a resolver. In this case, the resolver is electrically connected to the control circuit boards 41 and 42 by connection terminals or the like. In the connection terminals 49*a* and 49*b* of the relay terminal member 49 provided between the control circuit boards 41 and 42, pins having a function of transmitting magnetic signals of the magnetic sensors 411 and 412 are omitted to further reduce the size of the relay terminal member 49.

The motor apparatus 10 is not limited to the motor apparatus to be mounted on the electric power steering system, but is also applicable to a motor apparatus to be mounted on a drive apparatus configured to drive wheels of a vehicle.

What is claimed is:

1. A motor apparatus, comprising:
    a motor;
    a rotor having a rotor housing;
    a heat sink configured to promote heat dissipation; and
    a plurality of control circuit boards each including: (i) a power circuit configured to supply electric power to drive the motor, and (ii) a control circuit configured to control an operation of the power circuit, the plurality of control circuit boards being arranged with an overlapping portion to each other when viewed along an axial direction of a rotation shaft of the motor on an extension line of an axis of the rotation shaft, the plurality of control circuit boards including:
        a first control circuit board provided between the rotor housing and the heat sink, the first control circuit board including at least one magnetic sensor provided on or adjacent to the extension line of the axis of the rotation shaft and on a surface of a mounting face of the first control circuit board, wherein
    the overlapping portion of the plurality of control circuit boards intersects the extension line of the axis of the rotation shaft.

2. The motor apparatus according to claim 1, wherein the heat sink is configured to promote heat dissipation of at least one power circuit of a respective circuit board, wherein
    the plurality of control circuit boards include:
        a second control circuit board arranged across the heat sink in the axial direction of the rotation shaft, and
    the mounting face of the first control circuit board where a heating element of the power circuit of the first control circuit board is mounted and a mounting face of the second control circuit board where a heating element of the power circuit of the second control circuit board is mounted face the heat sink.

3. The motor apparatus according to claim 2, wherein
    a plurality of electronic components including the heating element are mounted on each of the first control circuit board and the second control circuit board,
    a distance between the heat sink and the heating element is shortest among distances in the axial direction between the heat sink and the plurality of electronic components mounted on the first control circuit board, and
    a distance between the heat sink and the heating element is shortest among distances in the axial direction between the heat sink and the plurality of electronic components mounted on the second control circuit board.

4. The motor apparatus according to claim 2, wherein the distance in the axial direction between the heat sink and the heating element of the first control circuit board is equal to the distance in the axial direction between the heat sink and the heating element of the second control circuit board.

5. The motor apparatus according to claim 2, wherein an area on the first control circuit board where the power circuit is mounted and an area on the second control circuit board where the power circuit is mounted do not overlap each other when viewed along the axial direction on the extension line of the axis of the rotation shaft.

6. The motor apparatus according to claim 2, wherein the area on the first control circuit board where the power circuit is mounted and the area on the second control circuit board where the power circuit is mounted are located at positions with rotational symmetry about an axis center of the rotation shaft when viewed along the axial direction on the extension line of the axis of the rotation shaft.

7. The motor apparatus according to claim 6, wherein
    the first control circuit board includes at least two magnetic sensors arranged at positions that are rotationally symmetrical about the axis center of the rotation shaft.

8. The motor apparatus according to claim 2, further comprising
    a first thermal insulation layer and a second thermal insulation layer, wherein
    the first control circuit board is interposed between the heat sink and the first thermal insulation layer in the axial direction of the rotation shaft, and
    the second control circuit board is interposed between the heat sink and the second thermal insulation layer in the axial direction of the rotation shaft.

9. The motor apparatus according to claim 1, wherein
    a plurality of transistors are mounted on an opposite surface of the first control circuit board, the opposite surface being opposite to the mounting face of the first control circuit board.

10. The motor apparatus according to claim 1, wherein
    each of the plurality of circuit boards include a plurality of transistors that are mounted on an opposite surface of a respective control circuit board, the opposite surface being opposite to a respective mounting face of a respective control circuit board.

* * * * *